United States Patent [19]

Qurnell et al.

[11] 4,196,048
[45] Apr. 1, 1980

[54] CORROSION MEASURING APPARATUS FOR RADIOACTIVE COMPONENTS

[75] Inventors: Franklin D. Qurnell, San Jose; George A. Sauer, Campbell, both of Calif.

[73] Assignee: General Electric Company, San Jose, Calif.

[21] Appl. No.: 859,318

[22] Filed: Dec. 12, 1977

[51] Int. Cl.² .................................................. G21C 17/00
[52] U.S. Cl. ..................................................... 176/19 R
[58] Field of Search ...................... 294/86 A, 93, 97; 204/195 C; 422/53; 23/253 C; 324/65 CR; 176/19 R

[56] References Cited

U.S. PATENT DOCUMENTS

| | | | |
|---|---|---|---|
| 1,357,099 | 10/1920 | Lawd et al. | 294/97 |
| 3,639,876 | 2/1972 | Wilson | 204/195 C |
| 3,691,011 | 9/1972 | Kruger et al. | 176/19 R |
| 3,699,436 | 10/1972 | Shigematsu et al. | 176/19 R |
| 3,780,571 | 12/1973 | Wiesener | 176/19 LD |
| 3,809,607 | 5/1974 | Murray et al. | 176/19 R |
| 3,846,795 | 11/1974 | Jones | 204/195 C |
| 3,862,578 | 1/1975 | Schluter | 176/19 R |
| 3,901,073 | 8/1975 | Dent et al. | 176/19 R |

OTHER PUBLICATIONS

Kaman Science Corporation advertising leaflets (undated, unnumbered).

Primary Examiner—Samuel W. Engle
Assistant Examiner—S. A. Cangialosi
Attorney, Agent, or Firm—Ivor J. James, Jr.; Samuel E. Turner; Sam E. Laub

[57] ABSTRACT

Remotely manipulatable probe and apparatus for positioning a corrosion thickness sensing transducer over selected areas of the internal surface of a tubular radioactive component submerged in a pool of water for radiation shielding.

16 Claims, 5 Drawing Figures

CORROSION MEASURING APPARATUS FOR RADIOACTIVE COMPONENTS

BACKGROUND

In known types of nuclear power reactors, for example as used in the Dresden Nuclear Power Station near Chicago, Ill., the reactor core comprises a plurality of spaced fuel assemblies arranged in an array capable of self-sustained nuclear fission reaction. The core is contained in a pressure vessel wherein it is submerged in a working fluid, such as light water, which serves both as coolant and as a neutron moderator. Each fuel assembly comprises a removable, tubular flow channel, typically of approximately square transverse cross-section, surrounding an array of elongated, cladded fuel elements or rods containing suitable fuel material, such as uranium or plutonium oxide, supported between upper and lower tie plates. The fuel assemblies are supported in spaced array in the pressure vessel between an upper core grid and a lower core support plate. The lower tie plate of each fuel assembly is formed with a nosepiece which fits in a socket in the core support plate for communication with a pressurized coolant supply chamber. The nosepiece is formed with openings through which the pressurized coolant flows upward through the fuel assembly flow channels to remove heat from the fuel elements. A typical fuel assembly of this type is shown, for example, by B. A. Smith, et al in U.S. Pat. No. 3,689,358. An example of a fuel element or rod is shown in U.S. Pat. No. 3,378,458.

Additional information on nuclear power reactors may be found, for example, in "Nuclear Power Engineering," M. M. El-Wakil, McGraw-Hill Book Company, Inc., 1962.

While the various reactor components are thoroughly factory tested before being placed in the reactor, there is a continuing need for in-service inspection equipment which can rapidly and conveniently verify the integrity of or detect any anomalies in such components at the reactor site, particularly after such components have been subjected to reactor service and have, therefore, become radioactive. Such radioactive condition of used components requires remotely operable equipment which can examine such components under water to protect the test equipment operators from radiation.

A particular need is inspection equipment which can provide a nondestructive examination and quantitative indication of corrosion formation, such as oxide formation, on such reactor components. It is particularly desirable to provide corrosion measurement of removable reactor components which potentially have a relatively long service life, such as fuel assembly flow channels.

For example, as mentioned above, each fuel assembly is surrounded by a removable, tubular flow channel. While the normal service life of a fuel assembly in the reactor core is on the order of four years, the flow channel can be removed and reused on a replacement fuel assembly in the absence of excessive corrosion or other defects.

Previous methods of determining the extent of channel corrosion involved the cutting up of a channel and the shipping of samples of corroded portions to a laboratory for examination. This approach resulted in destruction of potentially reusable channels, an undesirable expenditure of time and money and shipment and handling of radioactive material. Thus, there is a need for remotely operable, nondestructive corrosion measuring equipment for determining whether or not an irradiated component is fit for further service.

Fuel assembly channels are normally formed of a zirconium alloy and are made up of two U-shaped members welded together. They are usually factory processed by autoclaving (exposure to high temperature steam) to form a thin, tight protective oxide surface film of deep gray or black color.

In service, oxide corrosion occurs at local areas, especially at portions which have been exposed to highest temperatures and neutron flux density, and develops as clusters of pin-point spots or nodules of corrosion products which are light gray or white in color and which thus give the local area a "salt-and-pepper" appearance.

As such corrosion progresses, the nodules expand in area and eventually coalesce to form a continuous oxide corrosion film or sheet over the local area. Continued corrosion results in a thickening of the oxide film and eventual spalling, that is, a flaking off of the oxide particles. Under present procedures, the channel is removed from service before spalling is expected to occur to avoid contamination of the coolant with the oxide particles. Measurement of thickness of the corrosion film can be used to predict the onset of spalling. Measurement of corrosion thickness can also be used to indicate the effectiveness of heat treatment and other processes used to provide improved corrosion resistance. It is also desirable to examine other local areas of the channel, such as weld seams, for indications of corrosion.

In copending patent application, Ser. No. 805,649, filed June 13, 1977, now U.S. Pat. No. 4,145,251, there is shown a corrosion thickness sensing device which is remotely manipulatable and which can be visually positioned over selected external areas of a radioactive component. There is, however, continuing need for apparatus for measuring corrosion thickness on the internal surfaces of radioactive components which have a tubular or other enclosed shape, such as the internal surfaces of a tubular fuel assembly flow channel.

Therefore, it is an object of the invention to measure remotely and nondestructively formation of corrosion on a radioactive component.

It is another object of the invention to provide a corrosion thickness sensing means which readily and remotely can be positioned over selected internal areas of a tubular, radioactive component.

Equipment is commercially available which uses an eddy-current technique for indicating the distance between a transducer and a conductive surface. The transducer includes a coil which is energized by a high frequency current. Magnetic flux from the coil produces eddy currents in the conductive surface. Thus, the power or energy supplied by the coil to produce the eddy currents is also proportional to the distance between the transducer and the conductive surface. This displacement dependent variation in power is detected by suitable electronic circuitry and converted to a calibrated display or recording of the distance between the transducer and the conductive surface. Thus, such a device can be used to measure the thickness of a non-conductive coating, such as oxide corrosion, on a metal.

It is another object of the invention to utilize an eddy-current technique to measure remotely the thickness of corrosion on internal surfaces of radioactive components.

SUMMARY

These and other objects of the invention are achieved by a device, or probe, carrying one or more transducers, which can be remotely inserted and manipulated within a tubular, radioactive component submerged to a suitable depth in shielding water. The probe includes selectively retractable and extendable guides which can be remotely actuated, for example, by a pneumatic cylinder, to bear against opposite internal walls or corners of the component and to bring the transducer into contact with the internal surface of the component so that a corrosion thickness reading can be taken.

The guides can then be retracted and the probe moved longitudinally to another position. In this manner, the internal surface of the component can be scanned in a series of steps along the longitudinal path of the transducer.

When the guides are in the retracted position, the probe can be rotated to place the transducer on a different longitudinal path, for example, on a different wall of a component of square cross section.

Each transducer is supported in a spherical ball socket housing at the end of a spring-loaded arm. The ball socket insures axial perpendicularity between the transducer and the surface of the component, while spring loading of the arm insures a constant transducer loading force against the component surface.

DRAWINGS

DESCRIPTION

Figure 1:
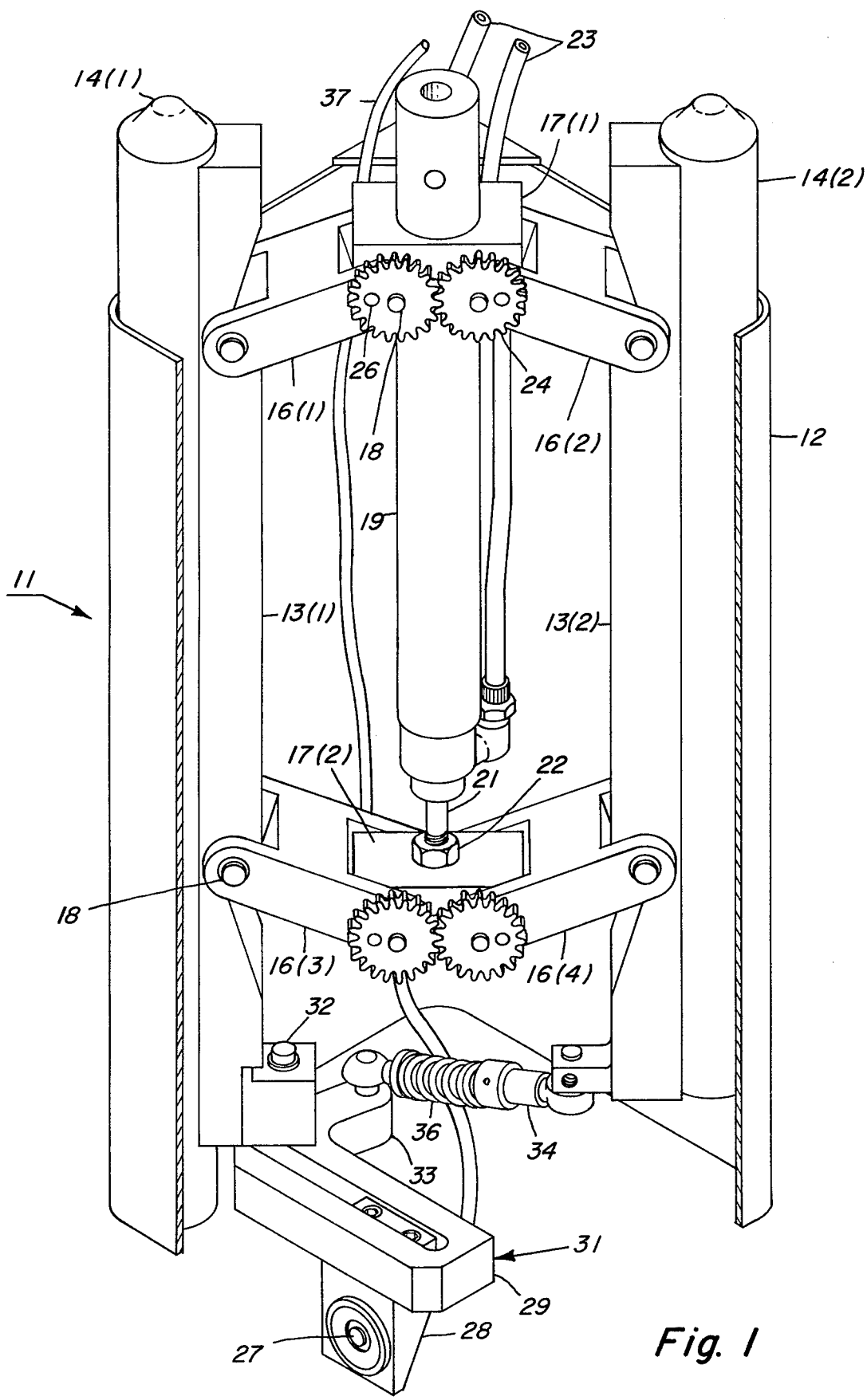
FIG. 1 is a perspective view illustrating the details of the probe of the invention.

A corrosion thickness measuring probe 11 is illustrated in FIG. 1 positioned within a fuel assembly channel 12. The probe comprises a pair of spaced, elongated guide members 13(1) and 13(2) fitted with nonmetallic (e.g., plastic, such as nylon) facing strips 14(1) and 14(2) to prevent marring of the channel inner surface. The strips 14(1) and 14(2) may be rounded to conform to the corners of the channel 12.

The guide members 13(1) and 13(2) are linked together by a pair of H-shaped upper actuating arms 16(1) and 16(2), a central upper block 17(1), a pair of lower actuating arms 16(3) and 16(4) and a central lower block 17(2), the arms 16(1)–16(4) being pivotably connected to the guide members 13(1) and 13(2) and to blocks 17(1) and 17(2) by suitable pivot pins 18.

A linearly extendable actuating mechanism, illustrated as a pneumatic cylinder 19, is connected between the blocks 17(1) and 17(2) whereby the distance between the blocks can be selectively and remotely changed to move the guide members 13(1) and 13(2) selectively from a retracted position to an extended position and vice versa.

Figure 4:
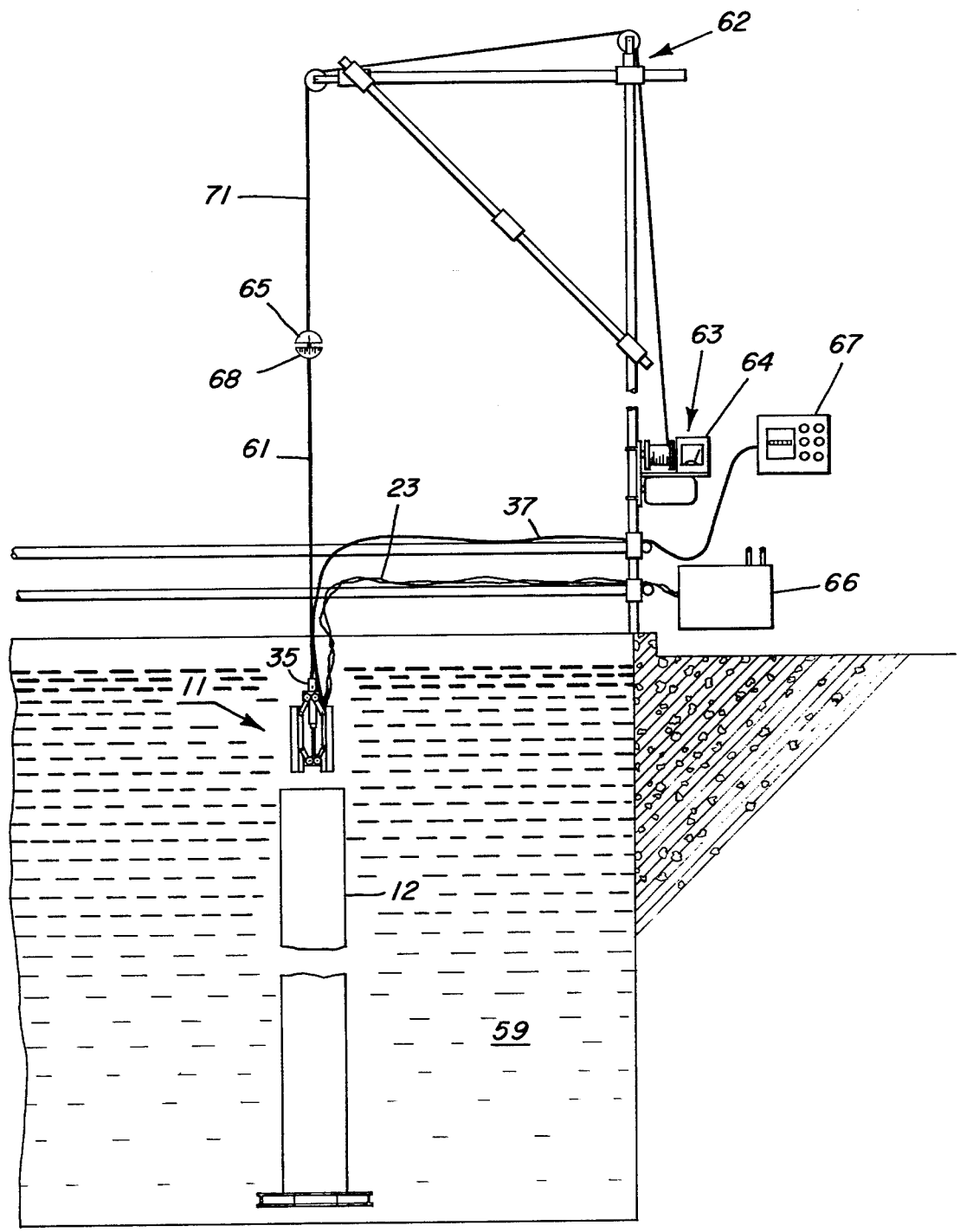
FIG. 4 is a perspective and schematic view of a system for using the probe of the invention for examining the inner surface of a fuel assembly channel in a water pool.

A piston rod 21 of the pneumatic cylinder 19 is formed with threads for engagement with lower block 17(2) to provide minor length adjustment therein, the rod 21 being locked in position by a lock nut 22. Connected to the pneumatic cylinder are fluid lines 23 from a controllable, pressurized fluid source at the remote operating position (as shown in FIG. 4).

To assure that the actuating arms 16(1) and 16(2) and 16(3) and 16(4) pivot in unison so that the guide members 13(1)–13(2) are maintained in parallel relation, meshing gear segments 24 are centered on the pivot pins 18 at the blocks 17(1) and 17(2) and are secured, respectively, to the actuating arms 16(1)–16(4) as by pins 26.

A corrosion sensing transducer 27 is supported in a support bracket 28, which, in turn, is adjustably secured to a long extension 29 of an L-shaped transducer support arm 31. The long extension 29 is longitudinally slotted to allow selective positioning of the bracket 28. The support arm 31 is pivotably supported on a pivot pin 32 secured to the guide member 13(1).

A short extension 33 of support arm 31 is connected by a resilient link 34 to guide member 13(2). Thus, as the guide members 13(1) and 13(2) are moved from the retracted to the extended position, the link 34 causes the support arm 31 to pivot outwardly to bring the transducer 27 into contact with the inner surface of channel 12, the link 34 acting in tension to maintain such contact.

As illustrated, the link 34 comprises telescoping members which are urged toward a retracted position by a compression spring 36. The link 34, therefore, acts as a tension spring.

A cable 37, connected to the transducer 27, conducts the transducer output signal to signal processing equipment at the remote operating position.

A fitting 35 attached to upper block 17(1) is adapted to receive a lifting cable or the like by which the probe 11 may be remotely inserted, removed and manipulated within the channel 12.

Figure 2:
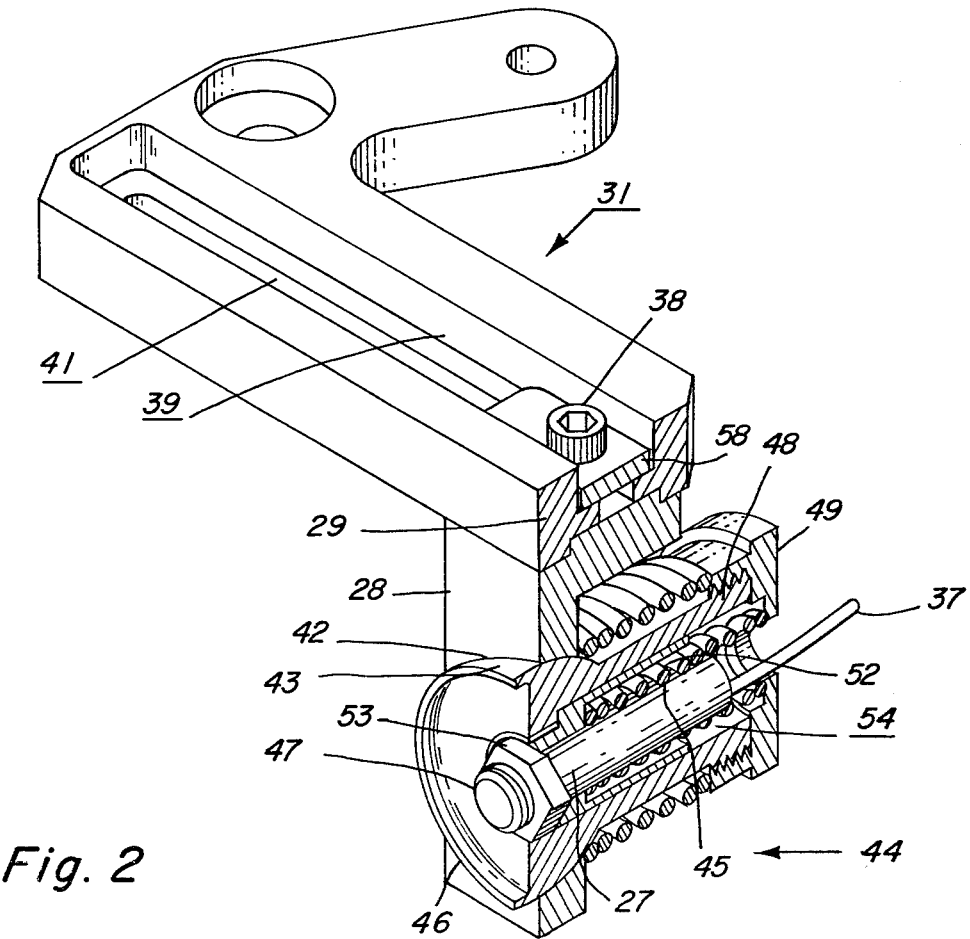
FIG. 2 is a partly cutaway perspective view of the mounting arrangement of the transducer in the support bracket.

Details of the mounting arrangement of transducer 27 in support bracket 28 are shown in FIG. 2. As mentioned hereinbefore, the bracket 28 is adjustably secured to the long extension 29 of arm 31 by a cap screw 38 and washer plate 58 in an elongated recess 39 through a slot 41.

The L-shaped bracket 28 is formed with a socket 42 to receive a hemispherical portion of a transducer carrier 44. The portion 43 terminates in a ring 46 surrounding the tip 47 of the transducer 27. When the probe 11 is in its operative position (with the guide members 13(1) and 13(2) extended as described hereinbefore), the ring 46 contacts the inside surface of the channel 12 under the force of resilient link 34 (FIG. 1) and moves the carrier 44 in the socket 42 as necessary to maintain the longitudinal axis of transducer 27 perpendicular to the channel surface.

The transducer carrier is formed with an extended cylindrical portion 48, which is threaded at its end to receive a spring retainer sleeve 49. A compression spring 51 between the sleeve 49 and the bracket 28 resiliently retains the hemispherical portion 43 in the socket 42.

The transducer 27 is adjustably secured to a hollow sleeve 52 by means of a threaded end portion and a lock nut 53, the sleeve 52 being fitted into a stepped bore 54 of carrier 44. A spring 45 urges the sleeve 52 toward its extreme position in bore 54. The transducer 24 is adjusted, by means of its threaded engagement with sleeve 52, so that the tip 47 extends somewhat beyond the plane of the surface of ring 46 when the sleeve 52 is in its extreme position. It is also arranged that the force of spring 45 is less than the resultant force of resilient link 34. (For example, in an actual, representative embodiment of the invention, the spring 45 exerts a force of 0.5–1 pounds and the resilient link 34 exerts a force of about 16 pounds which through the support arm 31 causes the ring 46 to exert a force against the channel surface of about 5 pounds.) Thus, in the operative position of the probe 11, the force of the resilient link 34 maintains the ring 46 in contact with the channel surface, while the spring 45 maintains the tip 47 of transducer 27 in contact with the channel surface.

Figure 3B:
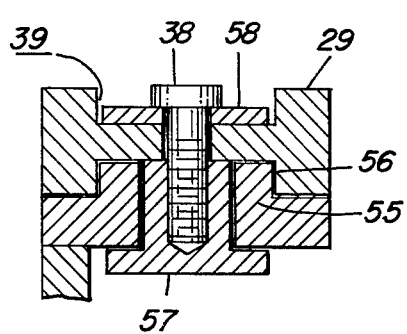
FIG. 3B is a cross section view illustrating attachment of the dual transducer support bracket to the support arm.
Figure 3A:
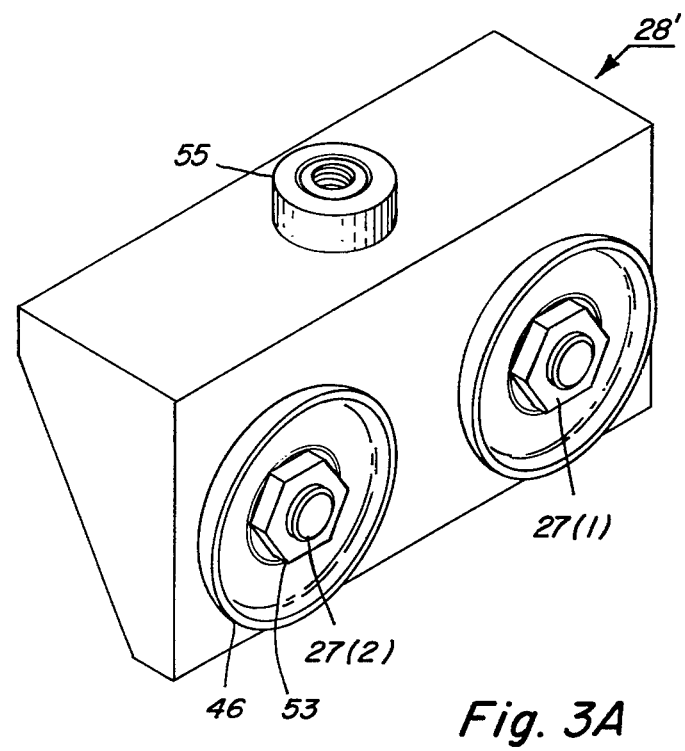
FIG. 3A illustrates an embodiment of a transducer support bracket for accommodating dual transducers.

Shown in FIGS. 3A and 3B is a transducer support bracket 28' for accommodating two transducers 27(1) and 27(2) so that two paths along the inner surface of the channel 12 can be scanned simultaneously. The transducers 27(1) and 27(2) can be mounted in the bracket 28' in a manner similar to the arrangement illustrated in FIG. 2. The primary difference between the single transducer bracket of FIG. 2 and the dual transducer bracket is that the latter must be arranged to swivel with respect to long extension 29 of support arm 31 so that the two transducers can bear equally against the inner surface of the channel.

To permit such swivel action, the bracket 28' is formed with a circular upstanding portion 55 which fits into an elongated guide groove 56 formed in the underside of arm extension 29. The portion 55 is apertured to receive, with suitable clearance, a flanged sleeve 57, which is secured to the extension 29 by cap screw 38 seated on washer plate 58 in the recess 39. In this manner, the bracket 28' can swivel with respect to the long extension 29 of support arm 31 as necessary to position the transducers against the inner surface of channel 12, and the bracket 28' can be positioned selectively along the outer portion of the extension 29 to scan different parallel paths along the inner surface of channel 12.

Use of the inspection equipment of the invention is illustrated in FIG. 4. The irradiated fuel assembly channel 12 to be examined is vertically supported by suitable means under a suitable depth (for example, 1.5 meters from the top of the channel) of water in a pool 59 for shielding the equipment operator (not shown) from radiation.

The probe 11 is attached by means of the fitting 35 to a rigid support member such as a length of tubing 61. The tubing 61 is connected by a swivel joint 65 to a chain or cable 71, which is directed over the pulleys of a boom arrangement 62 to a winch arrangement 63. Connected to the winch 63 is a travel indicator 64 for indicating the vertical position of the probe 11 within the channel 12. The swivel joint 65 allows the tubing 61 to be twisted manually to rotate the probe 11 to the angular position desired. The swivel joint 65 may be marked with a suitable scale 68 to indicate the angular position of the probe 11 with respect to the channel 12.

The fluid lines are connected to a suitable source of pressurized fluid 66, including suitable valves for controlling the operation of the pneumatic cylinder 19 of the probe 11.

The transducer signal cable 37 is connected to suitable signal processing and display and/or recording apparatus 67. For example, the unit 67 can provide a digital display of the distance between the transducer 27 and the electrically conductive surface of the channel 12 and thus, a direct indication of the thickness of the corrosion or oxide film on the inner surface of the channel.

The transducer 27 and the processing unit 67 are commercially available items. Such devices employing the eddy-current technique are available, for example, from Kaman Sciences Corporation, Colorado Springs, Colo., the transducer as a sensor model No. KD854150-040 and the unit 67 as gaging system model No. KD-2602.

Thus, what has been described is remotely manipulatable apparatus for detecting the thickness of corrosion along selected paths on the inner surface of a radioactive component.

What is claimed is:

1. Apparatus for detecting the thickness of a non-electrically conductive film such as corrosion product at selected areas on the internal surface of a radioactive, electrically conductive component submerged in a body of radiation shielding fluid, comprising: a probe including a pair of substantially parallel, spaced, elongated guide members; selectively actuatable mechanism interconnecting said guide members and operable to move said guide members from a retracted position adjacent one another to an extended position away from one another and vice versa while maintaining said guide members in substantially parallel relation, said guide members contacting opposite internal surfaces of said component when in said extended position, said probe being rotatable within said component when said guide members are in said retracted position; remotely operable means for selectively actuating said mechanism; a transducer support arm supported and pivoted at an inner end thereof on one of said guide members; a transducer supported at the outer end of said support arm; a support arm linkage connected between said support arm and the other guide member whereby in the extended position of said guide members said transducer is urged against an inner surface area of said component.

2. The apparatus of claim 1 wherein said radioactive component is a nuclear fuel channel.

3. The apparatus of claim 1 including resilient means for urging said transducer against said inner surface area of said component.

4. The apparatus of claim 1 wherein said transducer is resiliently mounted in a hemispherical member, including a raised ring surrounding said transducer and wherein said member is resiliently supported in a ball socket at said outer end of said arm whereby said transducer is maintained against said inner surface area with the longitudinal axis of said transducer perpendicular to said surface.

5. The apparatus of claim 1 wherein said transducer is adjustably supported by said support arm whereby said transducer may be selectively secured at different positions along a portion of the length of said support arm.

6. The apparatus of claim 1 wherein said guide members include nonmetallic facing strips for contacting said component to prevent damage to the surface thereof.

7. The apparatus of claim 1 wherein said support arm linkage comprises a telescoping member fitted with a compression spring to urge said telescoping member toward its telescoped position, said support arm linkage being connected to said support arm such as to urge resiliently said outer end of said support arm toward the inner surface of said component when said guide members are extended and to pivot said support arm away from said inner surface when said guide members are retracted.

8. The apparatus of claim 1 wherein said selectively actuatable mechanism comprises a linkage, including a pair of upper actuating arms and a pair of lower actuating arms pivotably connected to said guide members and to respective upper and lower central blocks and wherein said means for selectively actuating said mechanism includes linearly extendable means connected between said upper and lower blocks for changing the distance between said blocks.

9. The apparatus of claim 8 wherein said extendable means is a pneumatic cylinder.

10. The apparatus of claim 8, including a pair of meshing upper gear segments and a pair of lower meshing gear segments, each of said gear segments being secured to a respective one of said actuating arms adjacent the pivotable connection of the arm to said central blocks whereby said actuating arms are constrained to move in similar arcuate paths thereby to maintain said guide members in substantially parallel relation.

11. The apparatus of claim 1 further including means for inserting and supporting said probe within said component, including means for selectively moving said probe longitudinal along the length of said component.

12. The apparatus of claim 11, including means for indicating the longitudinal position of said probe within said component.

13. The apparatus of claim 1, including means for receiving and processing signals from said transducer.

14. The apparatus of claim 1, including a support bracket pivotally connected to said support arm and carrying a pair of spaced-apart transducers.

15. The apparatus of claim 8 wherein said extendable means is a hydraulic cylinder.

16. The apparatus of claim 11, including means for indicating the angular position of said probe within said component.

* * * * *